US012498909B2

United States Patent
Comeau et al.

(10) Patent No.: US 12,498,909 B2
(45) Date of Patent: Dec. 16, 2025

(54) GENERATION OF SOFTWARE COMPONENT DATA STRUCTURES BASED ON MONITORING NETWORK TRAFFIC OF SOFTWARE BUILD PROCESSES

(71) Applicant: Dell Products L.P., Round Rock, TX (US)

(72) Inventors: Mathew Comeau, Warren, MA (US); Taylor Harper, Colorado Springs, CO (US); Scott A. Leavitt, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 234 days.

(21) Appl. No.: 18/144,621

(22) Filed: May 8, 2023

(65) Prior Publication Data
US 2024/0378030 A1    Nov. 14, 2024

(51) Int. Cl.
*G06F 8/36* (2018.01)
*G06F 8/71* (2018.01)

(52) U.S. Cl.
CPC . *G06F 8/36* (2013.01); *G06F 8/71* (2013.01)

(58) Field of Classification Search
CPC .................................... G06F 8/36; G06F 8/71
See application file for complete search history.

(56) References Cited

U.S. PATENT DOCUMENTS

| | | | | |
|---|---|---|---|---|
| 8,875,090 | B2* | 10/2014 | Fox | G06F 9/44 717/121 |
| 11,416,224 | B1* | 8/2022 | Kaitha | G06F 8/36 |
| 2017/0147334 | A1* | 5/2017 | Antons | G06F 11/3476 |
| 2021/0056100 | A1* | 2/2021 | Steinhauser | G06F 16/248 |
| 2021/0157623 | A1* | 5/2021 | Chandrashekar | G06F 9/5027 |
| 2023/0342277 | A1* | 10/2023 | Rosati | H04L 9/3247 |

(Continued)

OTHER PUBLICATIONS

B. Xia et al., "An Empirical Study on Software Bill of Materials: Where We Stand and the Road Ahead," arXiv:2301.05362v3, Feb. 7, 2023, 13 pages.

(Continued)

*Primary Examiner* — Wei Y Mui
*Assistant Examiner* — Travis Viet Tran
(74) *Attorney, Agent, or Firm* — Ryan, Mason & Lewis, LLP

(57) ABSTRACT

An apparatus comprises a processing device configured to monitor network traffic of a software build process for a given piece of software, and to identify, utilizing the monitored network traffic, software artifacts downloaded for generating a software image for the given piece of software. The processing device is also configured to determine, for each of the identified software artifacts, software artifact metadata comprising software component configurations for that software artifact. The processing device is further configured to generate a software component data structure for the given piece of software comprising information characterizing the software component configurations for each of the identified software artifacts. The processing device is further configured to store the generated software component data structure for the given piece of software in association with the generated software image for the given piece of software.

20 Claims, 7 Drawing Sheets

(56) References Cited

U.S. PATENT DOCUMENTS

2024/0329953 A1* 10/2024 Cliffe .................... G06F 8/433
2024/0345822 A1* 10/2024 Mueller ................. G06F 16/27

OTHER PUBLICATIONS

The Apache Software Foundation, "Apache Log4j2," https://logging.apache.org/log4j/2.x/, May 2, 2023, 4 pages.

M. Balliu et al., "Challenges of Producing Software Bill of Materials for Java," arXiv:2303.11102v1, Mar. 20, 2023, 10 pages.

I. Barclay et al., "Towards Traceability in Data Ecosystems using a Bill of Materials Model," arXiv:1904.04253v1, Apr. 8, 2019, 6 pages.

IoT Security Foundation, "Software Bills of Materials for IoT and OT devices," An IoTSF Whitepaper, Release: 1.1.0, Feb. 20223, 26 pages.

* cited by examiner

GENERATION OF SOFTWARE COMPONENT DATA STRUCTURES BASED ON MONITORING NETWORK TRAFFIC OF SOFTWARE BUILD PROCESSES

FIELD

The field relates generally to information processing, and more particularly to techniques for managing software development processes.

BACKGROUND

Software development processes typically include multiple environments, such as one or more development environments, an integration testing environment, a staging environment, and a production environment. New software code may be created by individual developers or small teams of developers in respective ones of the development environments. The integration environment provides a common environment where software code from the multiple developers is combined and tested before being provided to the staging environment. The staging environment is designed to emulate the production environment and may be used for final review and approval before new software code is deployed in production applications in the production environment. In some cases, software development processes implement continuous integration/continuous deployment (CI/CD) functionality to enable frequent and reliable delivery of code changes for software.

SUMMARY

Illustrative embodiments of the present disclosure provide techniques for generation of software component data structures based on monitoring network traffic of software build processes.

In one embodiment, an apparatus comprises at least one processing device comprising a processor coupled to a memory. The at least one processing device is configured to monitor network traffic of a software build process for a given piece of software, and to identify, utilizing the monitored network traffic, one or more software artifacts downloaded for generating a software image for the given piece of software. The at least one processing device is also configured to determine, for each of the identified one or more software artifacts downloaded for generating the software image for the given piece of software, software artifact metadata comprising one or more software component configurations for that software artifact. The at least one processing device is further configured to generate a software component data structure for the given piece of software, the software component data structure comprising information characterizing the one or more software component configurations for each of the identified one or more software artifacts downloaded for generating the software image for the given piece of software. The at least one processing device is further configured to store the generated software component data structure for the given piece of software in association with the generated software image for the given piece of software.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
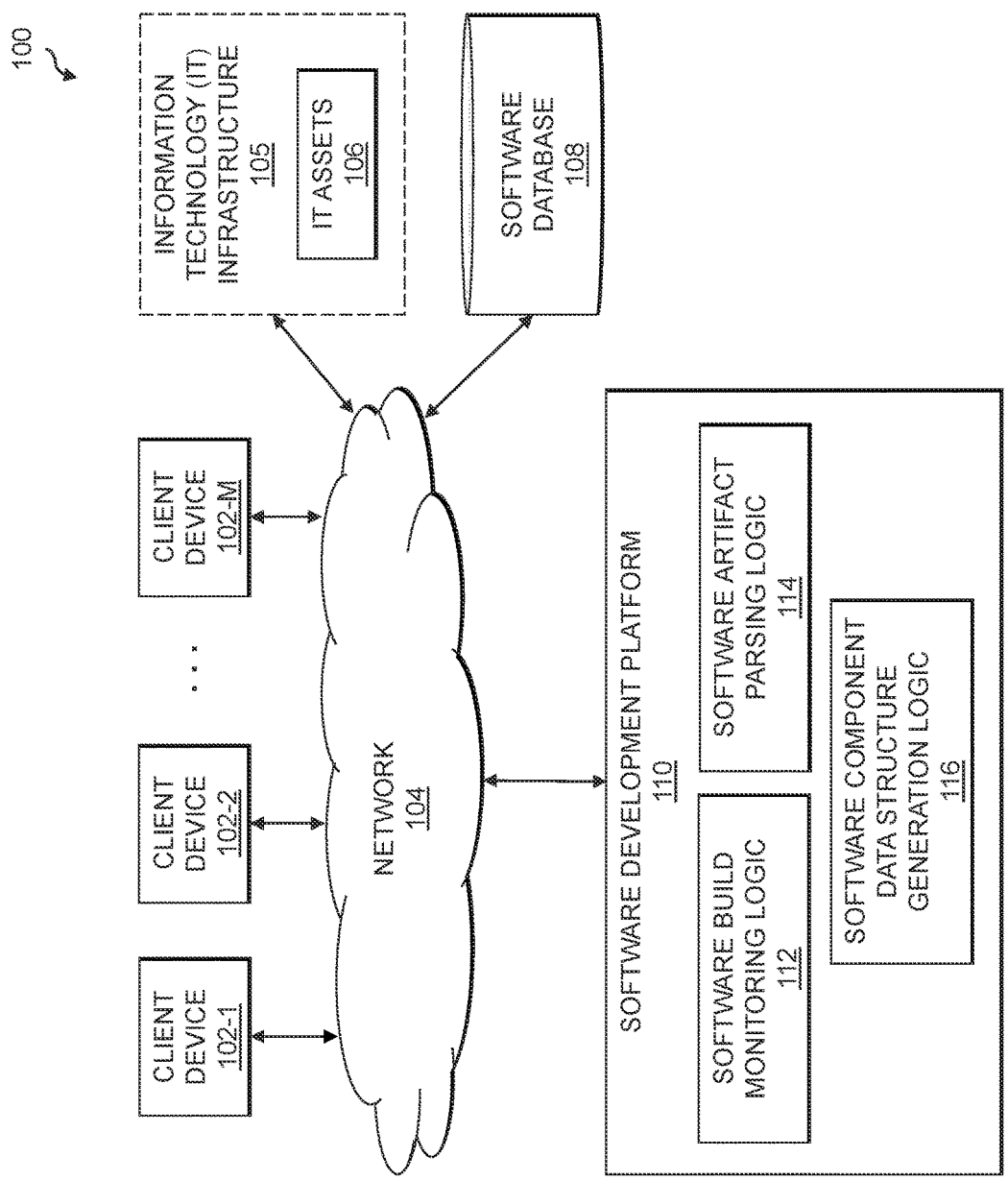
FIG. 1 is a block diagram of an information processing system configured for generation of software component data structures based on monitoring network traffic of software build processes in an illustrative embodiment.

FIG. 1 shows an information processing system 100 configured in accordance with an illustrative embodiment. The information processing system 100 is assumed to be built on at least one processing platform and provides functionality for automated generation of software component data structures, such as software bill of materials (sBOM) data structures, based on monitoring network traffic of software build processes. The information processing system 100 includes a set of client devices 102-1, 102-2, ... 102-M (collectively, client devices 102) which are coupled to a network 104. Also coupled to the network 104 is an information technology (IT) infrastructure 105 comprising one or more IT assets 106, a software database 108, and a software development platform 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the software development platform 110 is used for an enterprise system. For example, an enterprise may subscribe to or otherwise utilize the software development platform 110 for managing software builds which are developed by users of that enterprise (e.g., software developers or other employees, customers or users which may be associated with different ones of the client devices 102 and/or IT assets 106 of the IT infrastructure 105). As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different business, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. Additionally, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The software database 108 is configured to store and record various information that is utilized by the software development platform 110 for generating software images for different pieces of software, for generating sBOMs or other software component data structures for such different pieces of software, etc. Such information may include, for example, software artifacts which are used in generating the software image for a given piece of software, software artifact metadata (e.g., sBOMs for software artifacts), etc. In some embodiments, one or more of storage systems utilized to implement the software database 108 comprise a scale-out all-flash content addressable storage array or other type of storage array. Various other types of storage systems may be used, and the term "storage system" as used herein is intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the software development platform 110, as well as to support communication between the software development platform 110 and other related systems and devices not explicitly shown.

The software development platform 110 may be provided as a cloud service that is accessible by one or more of the client devices 102 to allow users thereof to manage generation of software builds and associated sBOMs or other software component data structures. The client devices 102 may be configured to access or otherwise utilize the IT infrastructure 105, such as to deploy generated software builds on one or more of the IT assets 106. In some embodiments, the client devices 102 are assumed to be associated with software developers, system administrators, IT managers or other authorized personnel responsible for managing software development for an enterprise. In some embodiments, the IT assets 106 of the IT infrastructure 105 are owned or operated by the same enterprise that operates the software development platform 110. In other embodiments, the IT assets 106 of the IT infrastructure 105 may be owned or operated by one or more enterprises different than the enterprise which operates the software development platform 110 (e.g., a first enterprise provides support for software builds and software component data structure generation for multiple different customers, business, etc.). Various other examples are possible.

In some embodiments, the client devices 102 and/or the IT assets 106 of the IT infrastructure 105 may implement host agents that are configured for automated transmission of information with the software development platform 110 regarding development of a particular piece of software and/or its associated software component data structure. It should be noted that a "host agent" as this term is generally used herein may comprise an automated entity, such as a software entity running on a processing device. Accordingly, a host agent need not be a human entity.

The software development platform 110 in the FIG. 1 embodiment is assumed to be implemented using at least one processing device. Each such processing device generally comprises at least one processor and an associated memory, and implements one or more functional modules or logic for controlling certain features of the software development platform 110. In the FIG. 1 embodiment, the software development platform 110 implements software build monitoring logic 112, software artifact parsing logic 114, and software component data structure generation logic 116. The software build monitoring logic 112 is configured to monitor network traffic by software build jobs or other processes, to identify when a software build job attempts to download software artifacts (e.g., dependent software packages or other software components). The software build monitoring logic 112 may control whether the software build jobs are able to download software artifacts from different sources (e.g., which may include the software database 108), and logs each software artifact that is downloaded by a given software build job. The software artifact parsing logic 114 is configured to parse such logs to identify software artifact metadata for each software artifact that is logged by the software build monitoring logic 112. The software artifact metadata may be retrieved, for example, from the software database 108. The software component data structure generation logic 116 is configured to build the sBOM or other software component data structure for a given piece of software generated by the given software build job utilizing the retrieved software artifact metadata. The software component data structure generation logic 116 may store the generated sBOM or other software component data structure for the given piece of software as new software artifact metadata in the software database 108.

It is to be appreciated that the particular arrangement of the client devices 102, the IT infrastructure 105, the software database 108 and the software development platform 110 illustrated in the FIG. 1 embodiment is presented by way of example only, and alternative arrangements can be used in other embodiments. As discussed above, for example, the software development platform 110 (or portions of components thereof, such as one or more of the software build monitoring logic 112, the software artifact parsing logic 114, and the software component data structure generation logic 116) may in some embodiments be implemented internal to one or more of the client devices 102 and/or the IT infrastructure 105.

At least portions of the software build monitoring logic 112, the software artifact parsing logic 114, and the software component data structure generation logic 116 may be implemented at least in part in the form of software that is stored in memory and executed by a processor.

The software development platform 110 and other portions of the information processing system 100, as will be described in further detail below, may be part of cloud infrastructure.

The software development platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the software database 108 and the software development platform 110 or components thereof (e.g., the software build monitoring logic 112, the software artifact parsing logic 114, and the software component data structure generation logic 116) may be implemented on respective distinct processing platforms, although numerous other arrangements are possible. For example, in some embodiments at least portions of the software development platform 110 and one or more of the client devices 102, the IT infrastructure 105 and/or the software database 108 are implemented on the same processing platform. A given client device (e.g., 102-1) can therefore be implemented at least in part within at least one processing platform that implements at least a portion of the software development platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the software database 108 and the software development platform 110, or portions or components thereof, to reside in different data centers. Numerous other distributed implementations are possible. The software development platform 110 can also be implemented in a distributed manner across multiple data centers.

Additional examples of processing platforms utilized to implement the software development platform 110 and other components of the information processing system 100 in illustrative embodiments will be described in more detail below in conjunction with FIGS. 5 and 6.

It is to be understood that the particular set of elements shown in FIG. 1 for automated generation of software component data structures based on monitoring network traffic of software build processes is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for automated generation of software component data structures based on monitoring network traffic of software build processes will now be described in more detail with reference to the flow diagram of FIG. 2. It is to be understood that this particular process is only an example, and that additional or alternative processes for automated generation of software component data structures based on monitoring network traffic of software build processes may be used in other embodiments.

In this embodiment, the process includes steps 200 through 208. These steps are assumed to be performed by the software development platform 110 utilizing the software build monitoring logic 112, the software artifact parsing logic 114, and the software component data structure generation logic 116. The process begins with step 200, monitoring network traffic of a software build process for a given piece of software. One or more software artifacts which are downloaded for generating a software image for the given piece of software are identified in step 202 utilizing the monitored network traffic. The software build process comprises a Continuous Integration/Continuous Deployment (CI/CD) software build process. The software build process may instantiate a software component data structure generation service, the software component data structure generation service implementing a proxy server which logs uniform resource locators (URLs) of software artifact download requests sent by the software build process. At least one of the one or more software artifacts may comprise a software package, a software component having a software dependency with at least a portion of software code of the given piece of software, etc.

In step 204, software artifact metadata is determined for each of the identified one or more software artifacts which are downloaded for generating the software image for the given piece of software. The software artifact metadata may comprise one or more software component configurations (e.g., sBOMs) for each of the software artifacts. A software component data structure for the given piece of software is generated in step 206. The software component data structure comprises information characterizing the one or more software component configurations for each of the identified one or more software artifacts downloaded, to generate the software image for the given piece of software. In step 208, the generated software component data structure for the given piece of software is stored in association with the generated software image for the given piece of software.

The software artifact metadata for the one or more software artifacts may be retrieved from an artifact storage, the artifact storage comprising a trusted data store of a software development platform implementing the software build process. At least one of the one or more software artifacts may be downloaded from the artifact storage. At least one of the one or more software artifacts may be downloaded from a data store external to the artifact storage. Software artifact metadata for the at least one of the one or more software artifacts downloaded from the external data store may be populated in the artifact storage in response to download of the at least one of the one or more software artifacts from the external data store. The generated software component data structure may be stored in the artifact storage as software artifact metadata for the given piece of software. The generated software component data structure may flag ones of the one or more software artifacts which are at least one of: downloaded from one or more designated data sources (e.g., untrusted or unsanctioned data sources, external data sources other than trusted artifact storage, etc.); and downloaded utilizing one or more designated protocols (e.g., untrusted protocols, insecure protocols, etc.).

Figure 2:
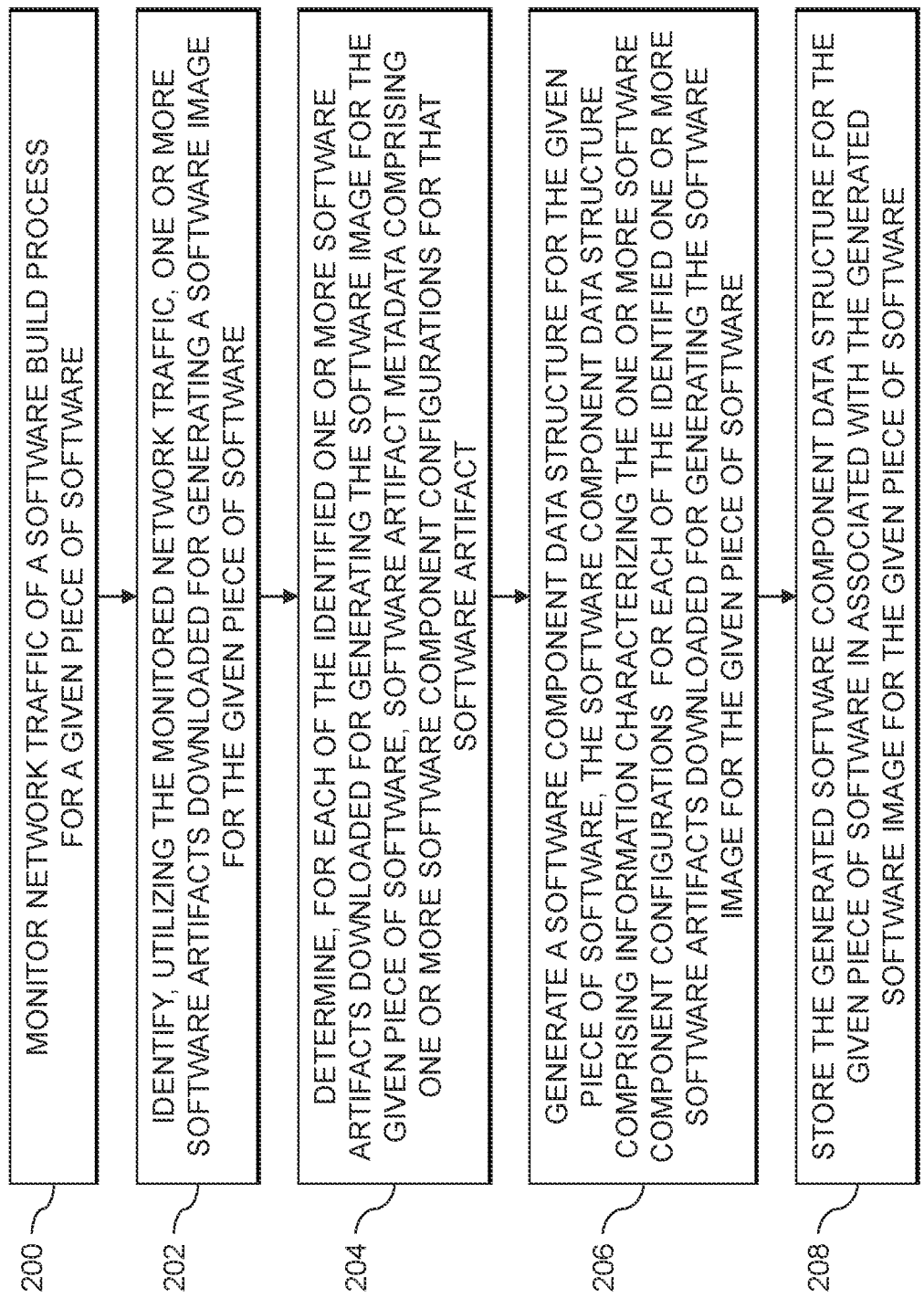
FIG. 2 is a flow diagram of an exemplary process for generation of software component data structures based on monitoring network traffic of software build processes in an illustrative embodiment.

In some embodiments, the FIG. 2 process further comprises performing auditing of the given piece of software utilizing the generated software component data structure, performing vulnerability analysis for the given piece of software utilizing the generated software component data structure, etc. The generated software component data structure may be used in generating one or more additional software component data structures for one or more additional pieces of software which utilize the given piece of software.

In software development processes, it is difficult for software developers to generate a complete and accurate sBOM. Package management systems may be used to automatically resolve and acquire dependency information for software packages, which are examples of what is more generally referred to herein as software artifacts. Upon installation, however, some malicious software packages may circumvent a package manager and download other resources (e.g., other software artifacts). While it is possible to try to analyze the software build process itself, or resulting software artifacts using Software Component Analysis (SCA) tools, such approaches are prone to false positives and false negatives, especially as the complexity of their target increases. Thus, software developers must expend significant effort and resources to manually correct a SCA tool's version of the sBOM for a particular piece of software.

sBOMs may be required for software in various use cases. For example, a recent United States executive order requires a sBOM for all software that is used in federal spaces and critical industries. As another example, some sales of software may require a sBOM to accompany purchased software (e.g., for auditing, regulatory compliance, enterprise governance, risk management and compliance (GRC) processes, etc.). Further, sBOMs are useful for analyzing software vulnerabilities, such as for determining whether a given piece of software may be affected by vulnerabilities based on the software artifacts used in the given piece of software. Various software vulnerability analysis tools, such as Trek TCP/IP Stack, Log4j, etc., may rely on sBOMs for analysis. In addition, it is best practice for any software developer to know exactly what software components or artifacts are in a given piece of software. A sBOM can provide this information for these and other use cases.

Illustrative embodiments provide technical solutions which utilize network inspection via a Man-in-the-Middle proxy server (e.g., a Transport Layer Security (TLS) proxy server) that monitors a software build's network traffic. Through analyzing the network traffic, the technical solutions are able to determine a list of software artifacts which are downloaded and used to build a given piece of software. For each software artifact, corresponding metadata may be fetched from a suitable software database. The technical solutions utilize such metadata for the software artifacts to automatically generate a sBOM for the given piece of software. The generated sBOM provides a complete and accurate sBOM for every software artifact used in the given piece of software. The given piece of software, and its generated sBOM, may also be stored as a new software artifact in the software database.

A software development platform may utilize a Continuous Integration/Continuous Deployment (CI/CD) build system. A CI/CD build system not only compiles and/or packages a project's source code, but also downloads dependencies of various types and origins. In some embodiments, an artifact storage system is used which serves as a sanctioned source of software artifacts no matter the type or origin. The software artifacts in the artifact storage system are analyzed upon ingest (and, optionally, periodically thereafter) so that the artifact storage system stores and maintains each software artifact's metadata. The software artifact metadata for a given software artifact includes, but is not limited to, the sBOM for the given software artifact. The artifact storage system may use a certificate signed by a Certificate Authority (CA) that is trusted by the CI/CD build system components.

Figure 3:
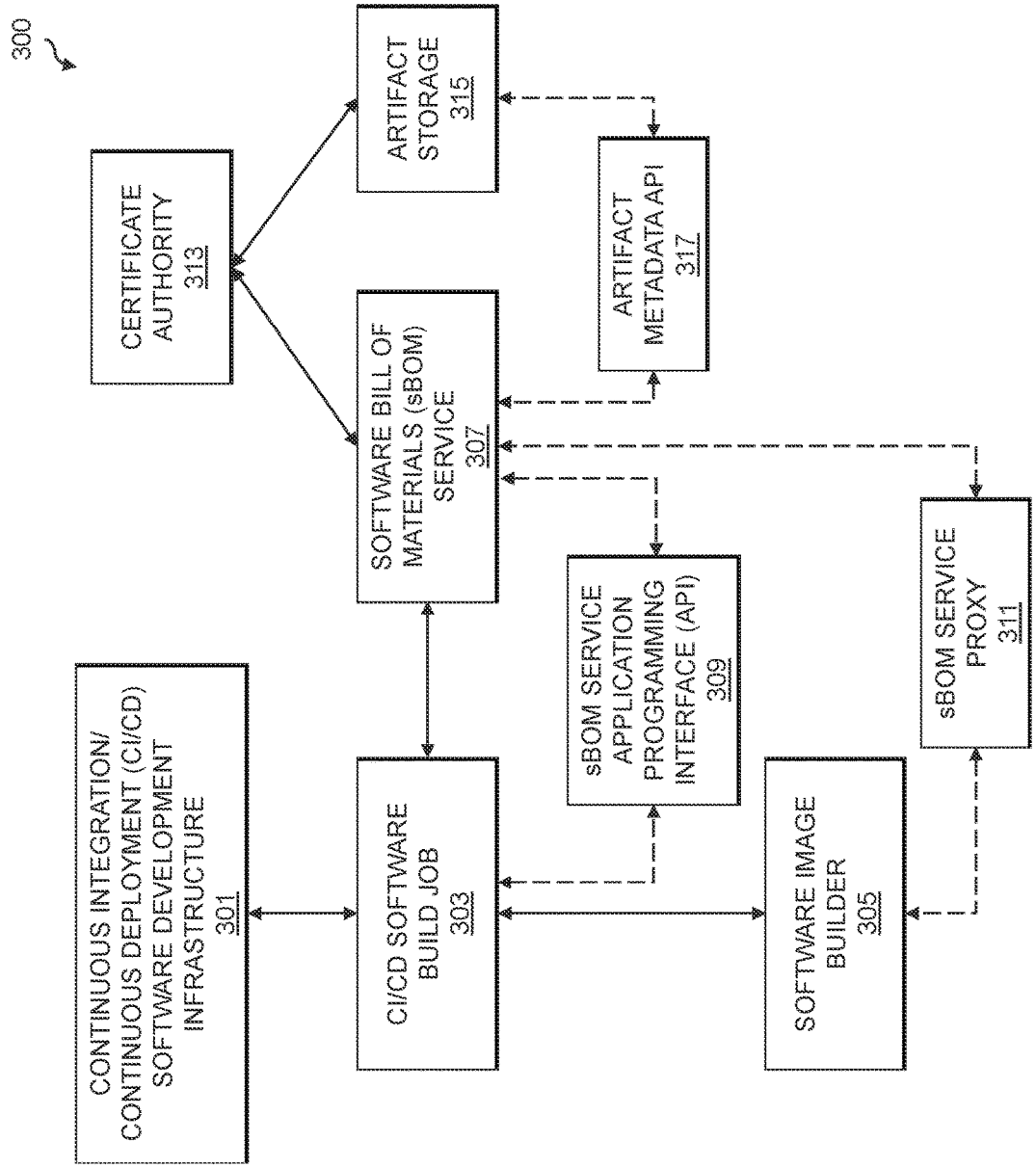
FIG. 3 shows a system configured for dynamic assembly of software bill of materials via network inspection and utilizing a software artifact metadata database in an illustrative embodiment.

FIG. 3 shows a software development system architecture 300, including a CI/CD software development infrastructure 301, which instantiates a CI/CD software build job 303 configured to interact with a software image builder 305 (e.g., a software container image builder). The CI/CD software build job 303 requests deployment of a sBOM service 307. In some embodiments, the sBOM service 307 is instantiated on demand or on request by the CI/CD software build job 303, and is unique and exclusive to the CI/CD software build job 303. In other embodiments, however, the sBOM service 307 may be shared among two or more CI/CD software build jobs.

The CI/CD software build job 303 will configure its build environment to use the sBOM service 307 via environment variables, build arguments and other configuration parameters required for the build. This may include configuring the CI/CD software build job 303 to utilize a sBOM service application programming interface (API) 309, and configuring the software image builder 305 to utilize a sBOM service proxy 311. The sBOM service 307 (and possibly its sub-components such as one or both of the sBOM service API 309 and the sBOM service proxy 311) may be provisioned with a signing certificate by a CA 313 that is trusted by the CI/CD software development infrastructure 301 and the CI/CD software build job 303. Alternatively, the sBOM service 307 may generate a self-signed certificate that is added to relevant trust stores within the CI/CD software development infrastructure 301.

When the CI/CD software build job 303 starts, all traffic is routed through the sBOM service proxy 311 of the sBOM service 307. The sBOM service proxy 311, for example, may re-write the TLS connection with its signing certificate such that the sBOM service proxy 311 is effectively a "man-inthe-middle" of the CI/CD software build job 303's TLS connection. Given that the sBOM service proxy 311 has access to all the decrypted traffic, the sBOM service proxy 311 is configured to log the full Uniform Resource Locator (URL) of every request (e.g., for software artifacts that are downloaded by the software image builder 305 to generate a software image (e.g., a software container image) for a given piece of software. For example, when the software image builder 305 seeks to download a given software artifact for use in building the software image for the CI/CD software build job 303, the sBOM service proxy 311 intercepts that request and logs the URL or other pointer to a location where the given software artifact is retrieved from. In some embodiments, it is assumed that all software artifacts are retrieved from artifact storage 315, which may comprise a database or other data store which contains various software artifacts and associated software artifact metadata. The artifact storage 315, similar to the sBOM service 307, may be provisioned with a certificate by the CA 313 trusted by the CI/CD software development infrastructure 301. The sBOM service 307 may interact with the artifact storage 315 using an artifact metadata API 317. It should be noted that if the CI/CD software build job 303 calls for a software artifact which is not stored within the artifact storage 315, when the software image builder 305 requests that software artifact from an external source that software artifact may first be downloaded from the external source via the sBOM service proxy 311. The sBOM service 307 may store the downloaded software artifact in the artifact storage 315 in association with its software artifact metadata for use in generating a sBOM for the CI/CD software build job 303.

When the CI/CD software build job 303 is complete, the CI/CD software build job 303 can use the sBOM service API 309 to retrieve a sBOM for the software image for the given piece of software which is generated by the software image builder 305. The sBOM service 307 will fulfill this request for the sBOM by parsing the logs of observed traffic captured by the sBOM service proxy 311 as described above. For each observed download of a software artifact, the sBOM service 307 will retrieve the corresponding metadata from the artifact storage 315 via the artifact metadata API 317. It should be noted, however, that in some embodiments the software artifacts and their associated metadata may be stored in separate databases or other data stores (e.g., the software artifacts themselves may be stored in the artifact storage 315 while the software artifact metadata may be stored in a separate data store, the software artifacts may be stored in external data sources while only the software artifact metadata is stored in the artifact storage 315, etc.). The software artifact metadata for a given software artifact will include a complete sBOM, or a reference to a sBOM, for the given software artifact. The software artifact metadata may additionally include other relevant metadata (e.g., dates, hashes of the software artifact and/or its associated sBOM, etc.). The sBOM service 307 will respond to the request for the sBOM with a sBOM data structure containing references to all the downloaded software artifacts as well as their retrieved metadata. The sBOM data structure may also flag downloads that were not from sanctioned sources, or those that used insecure protocols. The complete sBOM data structure may then be included in the metadata of the newly-built software image generated by the software image builder 305 for the CI/CD software build job 303. The newly-built software image represents a new software artifact, and may be stored (along with its sBOM) in the artifact storage 315 such that it can be retrieved when used during building of downstream or other software products.

Figure 4A:
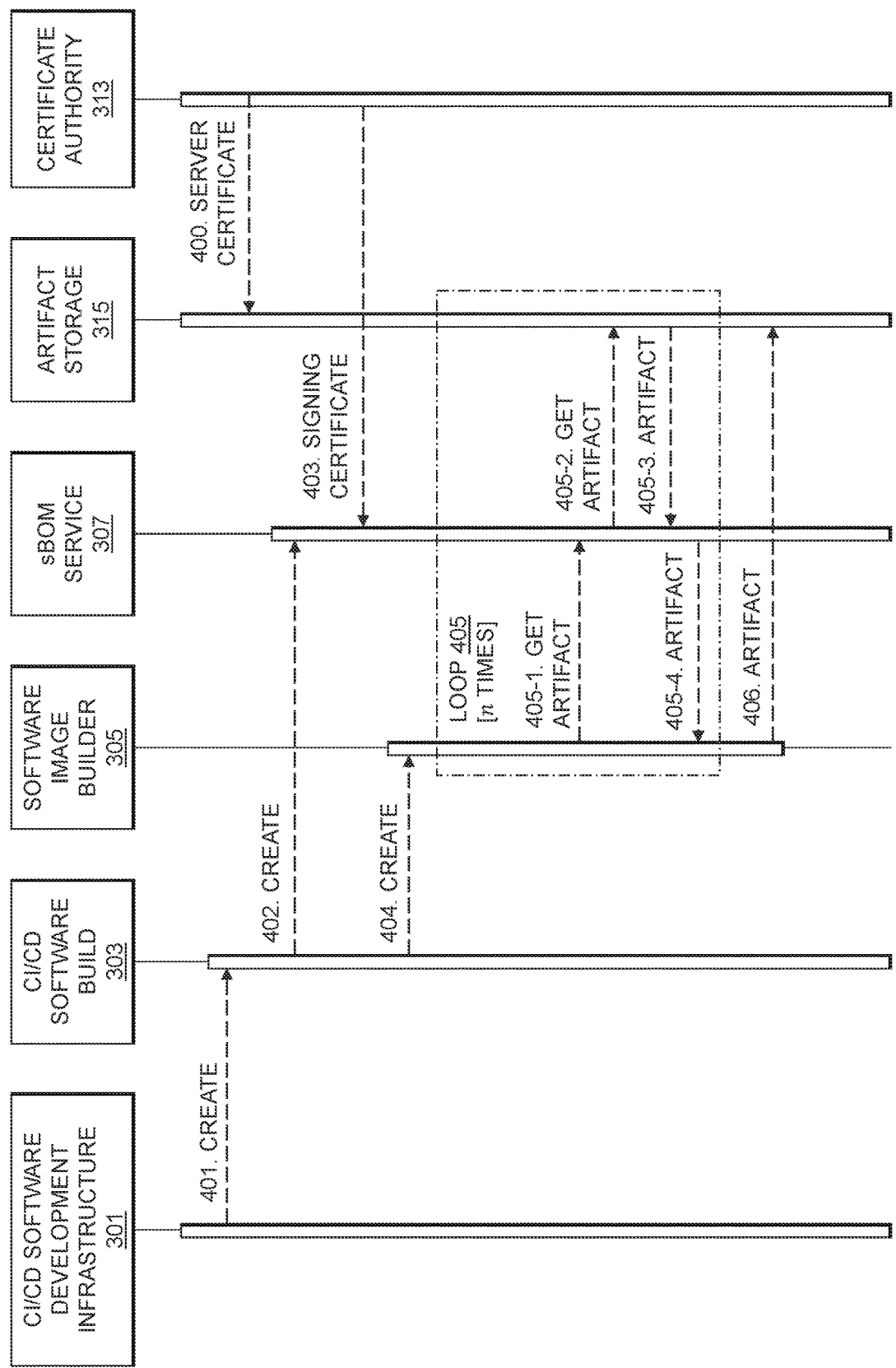
FIGS. 4A and 4B show a process flow for dynamic assembly of software bill of materials via network inspection and utilizing a software artifact metadata database in an illustrative embodiment.
Figure 4B:
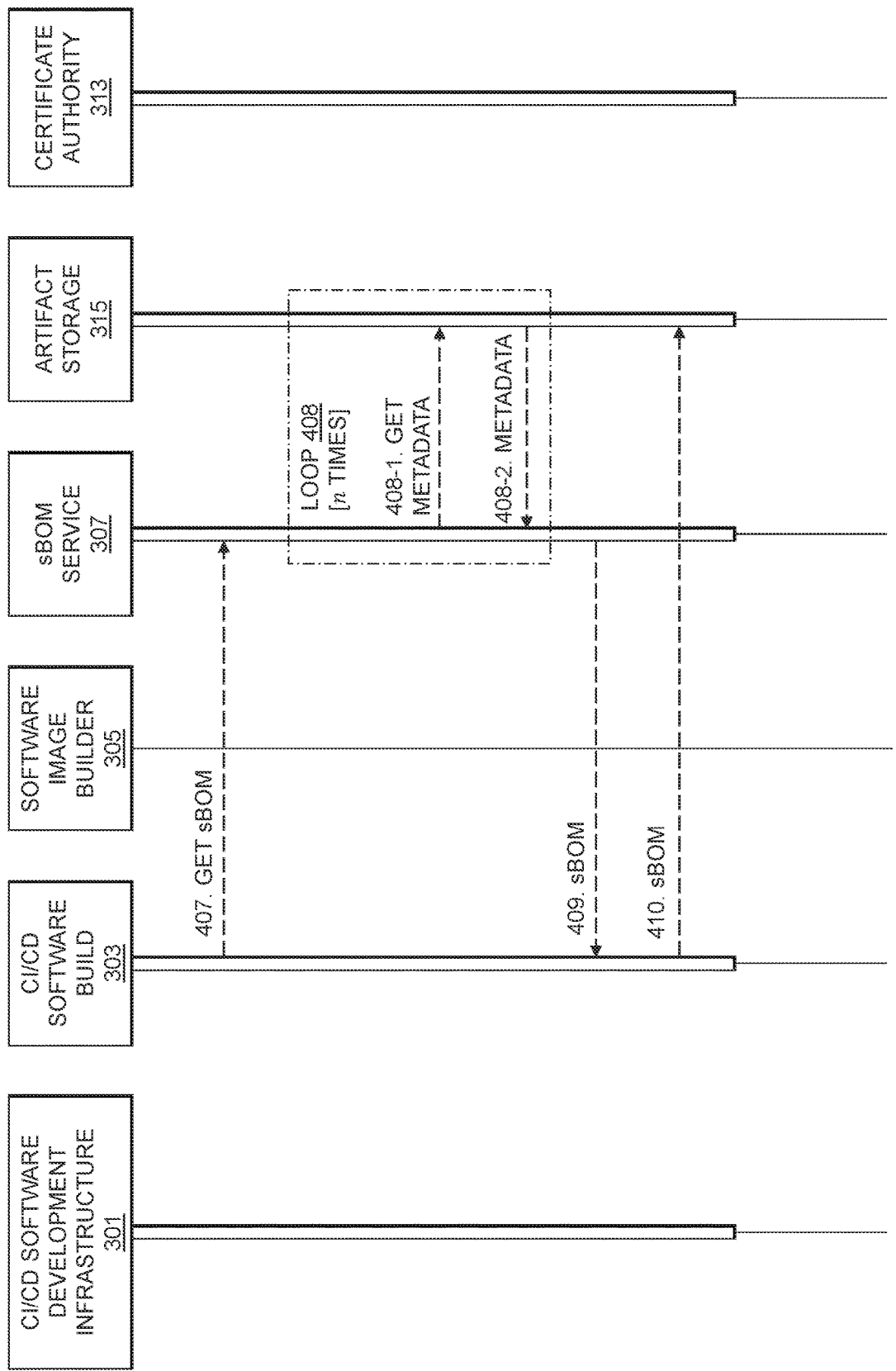

FIGS. 4A and 4B show a process flow which may be executed using the software development system architecture 300 of FIG. 3. As shown in FIG. 4A, the process flow may include provisioning a server certificate from the CA 313 to the artifact storage 315 in step 400. In step 401, the CI/CD software development infrastructure 301 creates the CI/CD software build job 303. The CI/CD software build job 303 in turn creates (e.g., requests instantiation of) the sBOM service 307 in step 402. The sBOM service 307 then obtains a signing certificate from the CA 313 in step 403. In step 404, the CI/CD software build sends instructions to the software image builder 305 to create a software image for a given piece of software. This begins a processing loop 405, which is executed n times (e.g., once for each of n software artifacts which are to be downloaded and used to create the software image for the given piece of software). Each instance of the processing loop 405 includes a series of steps 405-1 through 405-4. In step 405-1, the software image builder 305 sends a request for a software artifact which is intercepted by the sBOM service 307 (e.g., via the sBOM service proxy 311). The sBOM service 307 logs the request, and then retrieves the requested software artifact from the artifact storage 315 in step 405-2. The artifact storage 315 returns the requested software artifact to the sBOM service 307 in step 405-3, which in turn returns the requested software artifact to the software image builder 305 in step 405-4. Such steps are repeated n times as noted above (e.g., once for each software artifact needed to build the software image for the given piece of software). The software image builder 305, on generating the software image for the given piece of software, has created a new software artifact which is provided to the artifact storage 315 in step 406.

As shown in FIG. 4B, the process flow continues with step 407 where the CI/CD software build job 303 sends a request to the sBOM service 307 to get a sBOM for the given piece of software. Step 407 may include utilizing the sBOM service API 309. The process flow then enters into processing loop 408, which is executed n times (e.g., once for each software artifact that is part of the given piece of software), and includes steps 408-1 and 408-2. In step 408-1, the sBOM service 307 sends a request to the artifact storage 315 for software artifact metadata for a given software artifact used in the given piece of software. This may include utilizing the artifact metadata API 317. The artifact storage 315 in step 408-2 returns the requested software artifact metadata. All of the software artifact metadata is then collected and utilized to generate a sBOM data structure for the given piece of software, which is returned to the CI/CD software build job 303 in step 409. In step 410, the CI/CD software build job 303 provides the sBOM for the given piece of software for storage in the artifact storage 315.

The technical solutions described herein use the sBOM service proxy 311 (e.g., a TLS intercepting proxy) to gather a list of downloaded software artifacts for a given piece of software, providing a novel approach for determining dependencies for the given piece of software. The technical solutions described herein also leverage external metadata (e.g., from artifact storage 315) to acquire the sBOM for each downloaded software artifact, providing a novel approach for obtaining a complete and accurate sBOM for the given piece of software from the list of downloaded software artifacts. Such processing may be used for any combination of download software artifacts and metadata. The software artifacts may include, for example, source code from GitHub and metadata stored in a database, Red Hat Package Manager (RPM) packages or other packages stored in a repository alongside their metadata, or any other combination of build input and metadata. The sBOM service proxy 311, regardless of the source of software artifacts, is able to identify the input via network inspection and lookup of corresponding metadata from some other source (e.g., which may or not be the same database or other data store where the software artifacts themselves are retrieved from). In some embodiments, an intermediate signing certificate that is signed by a CA 313 that is already trusted by the CI/CD software development infrastructure 301 (e.g., which may be the same CA 313 that issued a certificate for the artifact storage 315 where the software artifacts and/or their associated metadata are stored) is utilized to provide a novel approach for integrating this functionality with minimal changes to existing CI/CD software build jobs.

Conventional approaches for generating a sBOM for a given piece of software may require software development teams to use SCA tools to determine the complete sBOM. The SCA tools may monitor the build process, or may analyze a completed software artifact. In either case, the SCA tools are not able to see the TLS traffic of the build, and so must operate on the results of the download/installation of dependencies (e.g., file system changes, package manager metadata, etc.). Complex software builds can, however, obscure some software artifacts through several layers of abstraction. For example, if a build installs an RPM that bundles packages of some other type, then the bundled packages may not be detected by the SCA tool. One may use more thorough processes to examine such RPMs, such as finding and analyzing the source code, but this manual effort is very costly to perform for every software build. The technical solutions described herein allow a system to focus the sBOM derivation efforts on individual software artifacts, rather than complex combinations of software artifacts. Further, the technical solutions are configured to maintain the sBOM for each software artifact separately from individual builds, such that a long, thorough process will not affect build times or waste effort on redundant processing. The technical solutions may also take advantage of metadata established by other processes which will attach software artifact metadata, including a sBOM, to all packages or other software artifacts as they cross the trust boundary to be stored in a location available to builds. The technical solutions leverage such software artifact metadata to produce sBOMs in a more automated and accurate way than conventional SCA approaches. Additionally, the technical solutions provide insight to the network traffic of software builds that was previously unavailable. This may be used to enforce policies like disallowing some software artifact sources and/or protocols.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for automated generation of software bill of materials through monitoring network traffic of software build processes will now be described in greater detail with reference to FIGS. 5 and 6. Although described in the context of system 100, these platforms may also be used to implement at least portions of other information processing systems in other embodiments.

Figure 5:
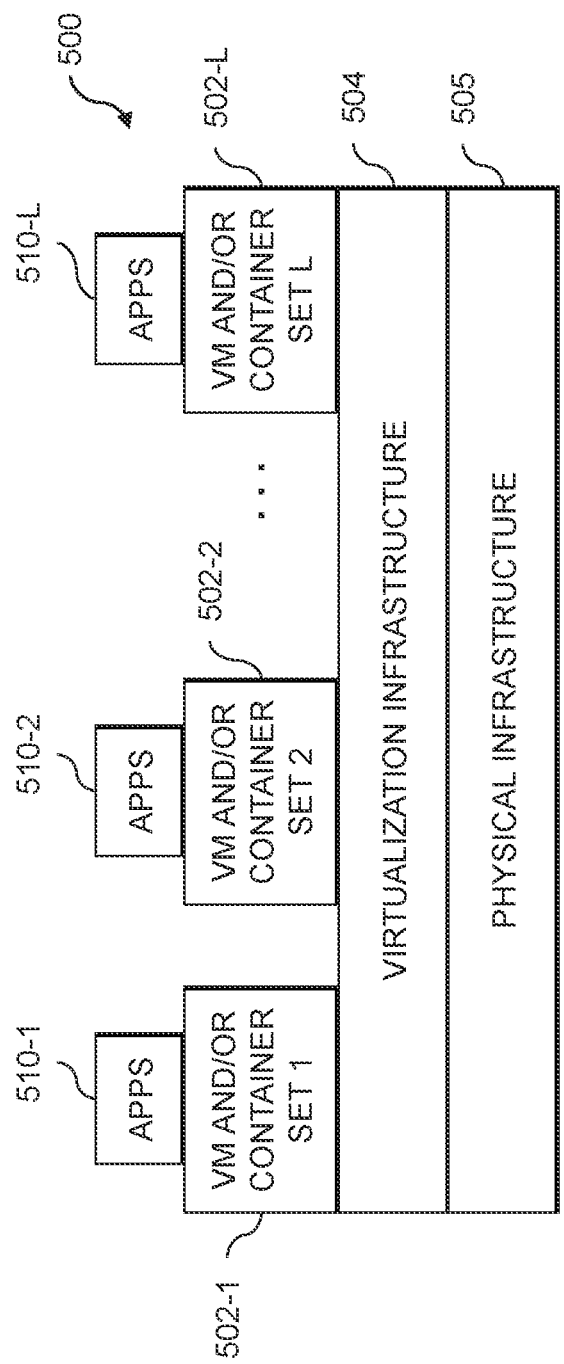
FIGS. 5 and 6 show examples of processing platforms that may be utilized to implement at least a portion of an information processing system in illustrative embodiments.
Figure 6:
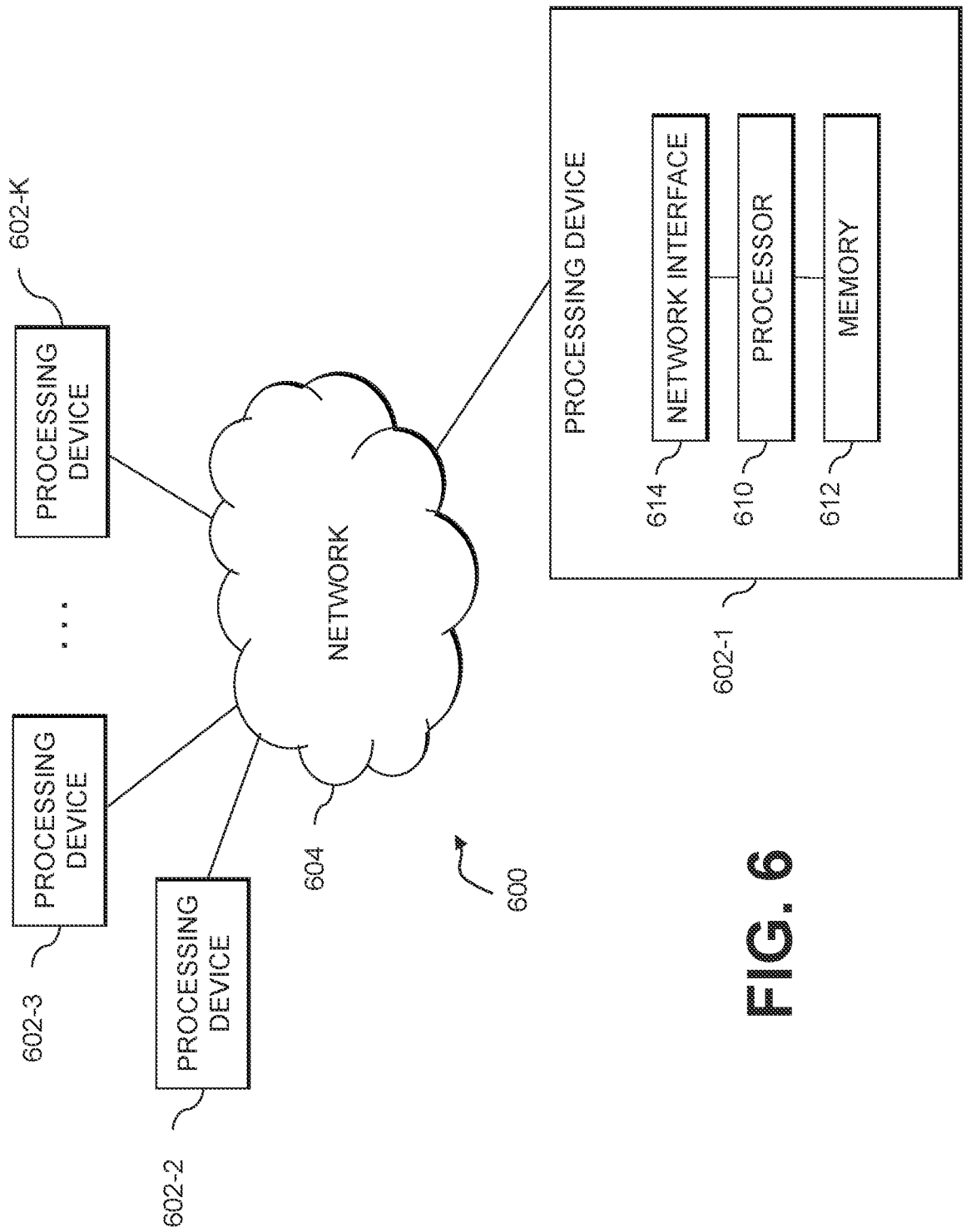

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU)

or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for automated generation of software bill of materials through monitoring network traffic of software build processes as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, information technology assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured:
        to instantiate, for a software build process for a given piece of software, a software component data structure generation service, the software component data structure generation service implementing a proxy server;
        to provision the proxy server implemented by the software component data structure generation service with a signing certificate of a certificate authority trusted by the software component data structure generation service;
        to configure the software build process for the given piece of software to utilize an application programming interface of the software component data structure generation service for routing network traffic associated with the software build process for the given piece of software through the proxy server implemented by the software component data structure generation service, wherein configuring the software build process for the given piece of software to utilize the application programming interface of the software component data structure generation service comprises securing one or more connections of the network traffic associated with the software build process utilizing the signing certificate provisioned in the proxy server implemented by the software component data structure generation service;
        to monitor the network traffic of the software build process for the given piece of software routed through the proxy server implemented by the software component data structure generation service;
        to identify, utilizing the monitored network traffic, one or more software artifacts downloaded for generating a software image for the given piece of software;
        to determine, for each of the identified one or more software artifacts downloaded for generating the software image for the given piece of software, software artifact metadata comprising one or more software component configurations;
        to generate a software component data structure for the given piece of software, the software component data structure comprising information characterizing the one or more software component configurations for each of the identified one or more software artifacts downloaded for generating the software image for the given piece of software; and
        to store the generated software component data structure for the given piece of software in association with the generated software image for the given piece of software.

2. The apparatus of claim 1 wherein the software build process comprises a continuous integration/continuous deployment software build process.

3. The apparatus of claim 1 wherein the proxy server implemented by the software component data structure generation service logs uniform resource locators of software artifact download requests sent by the software build process.

4. The apparatus of claim 1 wherein at least one of the one or more software artifacts comprises a software package.

5. The apparatus of claim 1 wherein at least one of the one or more software artifacts comprises a software component having a software dependency with at least a portion of software code of the given piece of software.

6. The apparatus of claim 1 wherein the software artifact metadata for the one or more software artifacts is retrieved from an artifact storage, the artifact storage comprising a trusted data store of a software development platform implementing the software build process.

7. The apparatus of claim 6 wherein at least one of the one or more software artifacts is downloaded from the artifact storage.

8. The apparatus of claim 6 wherein at least one of the one or more software artifacts is downloaded from a data store external to the artifact storage.

9. The apparatus of claim 8 wherein the software artifact metadata for said at least one of the one or more software artifacts is populated in the artifact storage in response to downloading of said at least one of the one or more software artifacts from the external data store.

10. The apparatus of claim 6 wherein the generated software component data structure is stored in the artifact storage as the software artifact metadata for the given piece of software.

11. The apparatus of claim 1 wherein the generated software component data structure flags ones of the one or more software artifacts which are at least one of:
   downloaded from one or more designated data sources; and
   downloaded utilizing one or more designated protocols.

12. The apparatus of claim 1 wherein the at least one processing device is further configured to perform auditing of the given piece of software utilizing the generated software component data structure.

13. The apparatus of claim 1 wherein the at least one processing device is further configured to perform vulnerability analysis for the given piece of software utilizing the generated software component data structure.

14. The apparatus of claim 1 wherein the at least one processing device is further configured to utilize the generated software component data structure in generating one or more additional software component data structures for one or more additional pieces of software which utilize the given piece of software.

15. A computer program product comprising a non-transitory processor-readable storage medium having stored therein program code of one or more software programs, wherein the program code when executed by at least one processing device causes the at least one processing device:
   to instantiate, for a software build process for a given piece of software, a software component data structure generation service, the software component data structure generation service implementing a proxy server;
   to provision the proxy server implemented by the software component data structure generation service with a signing certificate of a certificate authority trusted by the software component data structure generation service;
   to configure the software build process for the given piece of software to utilize an application programming interface of the software component data structure generation service for routing network traffic associated with the software build process for the given piece of software through the proxy server implemented by the software component data structure generation service, wherein configuring the software build process for the given piece of software to utilize the application programming interface of the software component data structure generation service comprises securing one or more connections of the network traffic associated with the software build process utilizing the signing certificate provisioned in the proxy server implemented by the software component data structure generation service;
   to monitor the network traffic of the software build process for the given piece of software routed through the proxy server implemented by the software component data structure generation service;
   to identify, utilizing the monitored network traffic, one or more software artifacts downloaded for generating a software image for the given piece of software;
   to determine, for each of the identified one or more software artifacts downloaded for generating the software image for the given piece of software, software artifact metadata comprising one or more software component configurations;
   to generate a software component data structure for the given piece of software, the software component data structure comprising information characterizing the one or more software component configurations for each of the identified one or more software artifacts downloaded for generating the software image for the given piece of software; and
   to store the generated software component data structure for the given piece of software in association with the generated software image for the given piece of software.

16. The computer program product of claim 15 wherein the program code when executed further causes the at least one processing device to perform auditing of the given piece of software utilizing the generated software component data structure.

17. The computer program product of claim 15 wherein the program code when executed further causes the at least one processing device to perform vulnerability analysis for the given piece of software utilizing the generated software component data structure.

18. A method comprising:
   instantiating, for a software build process for a given piece of software, a software component data structure generation service, the software component data structure generation service implementing a proxy server;
   provisioning the proxy server implemented by the software component data structure generation service with a signing certificate of a certificate authority trusted by the software component data structure generation service;
   configuring the software build process for the given piece of software to utilize an application programming interface of the software component data structure generation service for routing network traffic associated with the software build process for the given piece of software through the proxy server implemented by the software component data structure generation service, wherein configuring the software build process for the given piece of software to utilize the application programming interface of the software component data structure generation service comprises securing one or more connections of the network traffic associated with the software build process utilizing the signing certificate provisioned in the proxy server implemented by the software component data structure generation service;

monitoring the network traffic of the software build process for the given piece of software routed through the proxy server implemented by the software component data structure generation service;

identifying, utilizing the monitored network traffic, one or more software artifacts downloaded for generating a software image for the given piece of software;

determining, for each of the identified one or more software artifacts downloaded for generating the software image for the given piece of software, software artifact metadata comprising one or more software component configurations;

generating a software component data structure for the given piece of software, the software component data structure comprising information characterizing the one or more software component configurations for each of the identified one or more software artifacts downloaded for generating the software image for the given piece of software; and storing the generated software component data structure for the given piece of software in association with the generated software image for the given piece of software;

wherein the method is performed by at least one processing device comprising a processor coupled to a memory.

19. The method of claim 18 wherein the method further comprises performing auditing of the given piece of software utilizing the generated software component data structure.

20. The method of claim 18 wherein the method further comprises performing vulnerability analysis for the given piece of software utilizing the generated software component data structure.

\* \* \* \* \*